United States Patent
Mandic et al.

(10) Patent No.: US 10,298,755 B1
(45) Date of Patent: May 21, 2019

(54) DIALING LIST MANAGER FOR OUTBOUND CALLS

(71) Applicant: Authority Software LLC, Tamarac, FL (US)

(72) Inventors: Louis Mandic, Tamarac, FL (US); Natalie Perez, Tamarac, FL (US)

(73) Assignee: Authority Software LLC, Tamarac, FL (US)

( * ) Notice: Subject to any disclaimer, the term of this patent is extended or adjusted under 35 U.S.C. 154(b) by 0 days.

(21) Appl. No.: 15/813,819

(22) Filed: Nov. 15, 2017

(51) Int. Cl.
*H04M 3/51* (2006.01)
*H04M 3/523* (2006.01)

(52) U.S. Cl.
CPC ....... *H04M 3/5158* (2013.01); *H04M 3/5231* (2013.01); *H04M 2203/40* (2013.01)

(58) Field of Classification Search
CPC .................................................. H04M 3/5158
See application file for complete search history.

(56) References Cited

U.S. PATENT DOCUMENTS

| | | | |
|---|---|---|---|
| 7,106,843 B1 | 9/2006 | Gainsboro et al. | |
| 7,889,847 B2 | 2/2011 | Gainsboro | |
| 8,165,272 B2 | 4/2012 | Lindsey et al. | |
| 8,462,637 B1 | 6/2013 | Baldwin et al. | |
| 8,654,964 B1 * | 2/2014 | Noble, Jr. | H04M 3/5158 379/265.01 |
| 9,426,294 B1 * | 8/2016 | Lillard | H04M 3/42382 |
| 9,614,960 B1 * | 4/2017 | McDaniel | H04M 3/22 |
| 9,641,676 B1 | 5/2017 | Mandic et al. | |
| 2004/0179672 A1 * | 9/2004 | Pagel | H04M 3/5158 379/266.1 |
| 2007/0041545 A1 | 2/2007 | Gainsboro | |
| 2013/0202101 A1 * | 8/2013 | LaBoyteaux | H04M 3/5158 379/265.02 |
| 2014/0115486 A1 * | 4/2014 | Benson | G06Q 10/06 715/739 |
| 2015/0161722 A1 | 6/2015 | Harp | |

OTHER PUBLICATIONS

U.S. District Ct, E.District of Michigan, So. Division, Case No. 2:15-cv-11717, *Smith v. Stellar Recovery, Inc.* "Opinion and Order Granting PL's Mot. to Extend Time" Mar. 13, 2017.
Agent Api V8.0—Sep. 1, 2017 by Incontact, Inc. at https://developer.incontact.com.
Cisco Web Dialer API Reference Guide, Rel. 4.2(3) 2006 by Cisco Systems, Inc. of San Jose, Ca., Circa 2006.
Batch and Import: The Big Picture, Aug. 14, 2015 by Blackbaud at www.blackboard.com/ files/support/guides/enterprise/400/batch.

* cited by examiner

*Primary Examiner* — Nafiz E Hoque
(74) *Attorney, Agent, or Firm* — Robert C. Kain, Jr.

(57) ABSTRACT

A dialing list is managed, with human intervention, by obtaining a proposed call list for to-be-called (TBC) parties from a source, which list is displayed to a call center (CC) agent who selects one or more TBC parties, which causes generation of an agent-approved (AA) call list. Outbound calls are made using the AA call list. TBC parties not selected are not called by the dialing platform. The dialing platform responsive in-bound calls and non-productive (NP) calls. The AA call list is supplemented with NP call data such that TBC parties are linked to NP call data, thereby creating a productive TBC call list. A telecom session is initiated between the CC agent and the TBC called party.

2 Claims, 2 Drawing Sheets

DIALING LIST MANAGER FOR OUTBOUND CALLS

The present invention relates to a method for managing a dialing list used to initiate outbound calls to a plurality of to-be-called (TBC) parties.

BACKGROUND OF THE INVENTION

In the call center industry, call center agents respond to telephone call inquiries from customers and businesses. However, in order to promote goods and services of call center ("CC") business customers, the call center utilizes call center agents to call members of the general public and discuss potential sales of goods and services for call center business customers. Regarding these outbound calls to the general public, it is not efficient to have the call center agents independently dial each called party or TBC party. It is also known that CC business customers can purchase a list of telephone numbers which includes the name of the TBC party or use their own compiled list of customers (also compiled from business affiliates).

In reaction to an overuse of telephone calls to members of the general public using automatic telephone dialing systems, the federal government enacted the Telephone Consumer Protection Act, 47 U.S.C. sec. 151-231. The Act, as construed by the Federal Communications Commission, prohibits the use of a predictive dialer function by a call center. However, a recent court decision has found that when a call center agent chooses to launch a call to a TBC party on a call list, this does not fall within the prohibition of an automated call distributor (ACD) system as defined by the Telephone Consumer Protection Act. In Smith v. Stellar Recovery, Inc., Case No. 2:15-cv-11717 (Mar. 13, 2017, ED Mich, Order and Opinion), the court described Stellar Recovery, Inc.'s system as having a Human Call Initiator (HCl) system which is different than the prohibited ACD autodialers. The Stellar system "requires human intervention—the clicker agent—to launch an outgoing call. ([Stellar's manager] Stark's testimony explain[s] that only when an 'agent chooses to launch the call' can the [human call initiator] HCl system make an outgoing call). Since the 'basic function' of [a prohibited] autodialer is the capacity to dial phone numbers 'without human intervention,' and the [Stellar human call initiator] HCl system lacks that capacity, the HCl is not an autodialer." Opinion page 6.

OBJECTS OF THE INVENTION

It is an object of the present invention to provide a dialing list manager for outbound calls wherein an agent—operator selects one or more TBC parties from a proposed call list.

Is a further object of the present invention to provide human interaction for a TBC call list prior to initiating outbound calls based upon and agent approved (AA) call list.

It is an additional object the present invention to supplement the agent approved AA call list with nonproductive (NP) call data representing responsive inbound calls from answer machines, disconnect signals, busy signals, special information tone (SIT) responses and no-answer-from-called-party call events.

BRIEF DESCRIPTION OF THE DRAWINGS

Further objects and advantages of the present invention can be found in the detailed description of the preferred embodiments when taken in conjunction with the accompanying drawings.

SUMMARY OF THE INVENTION

Figure 1:
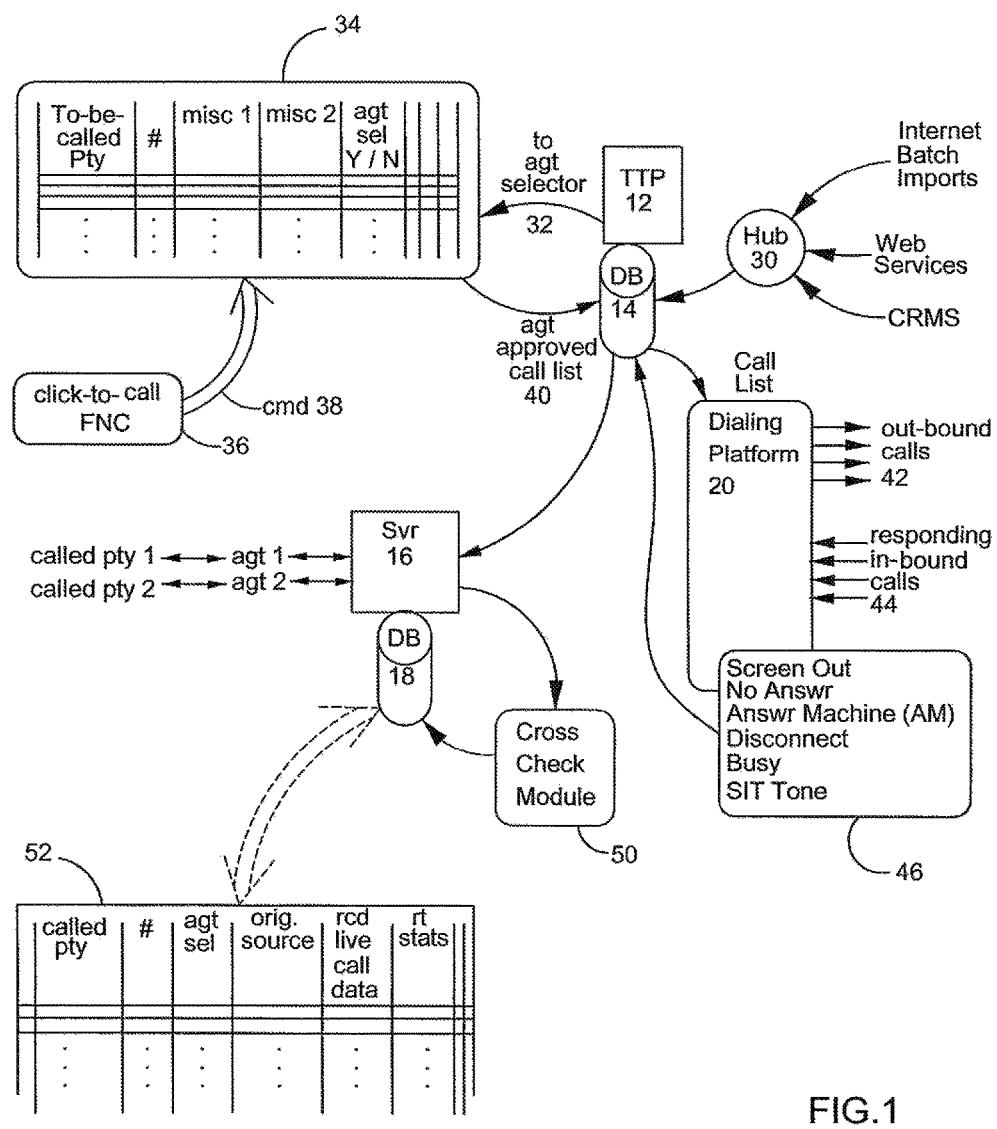
FIG. 1 diagrammatically illustrates major system elements and the development of an agent approved AA call list as well as screen out functions for inbound communications.

A dialing list is used to initiate outbound calls to a plurality of to-be-called (TBC) parties. The method of managing a dialing list, with human intervention, includes obtaining a proposed call list for TBC parties from a source. The proposed call list is displayed to a call center (CC) operator or agent. The CC operator/agent accepts, by one or more selection commands, one or more TBC parties from the original, proposed call list. The system then generates an agent-approved (AA) call list based upon the selection commands. The system then initiates outbound calls to TBC parties using the AA call list. TBC parties who are not selected from the proposed call list are not on the AA call list and are not subject to outbound calls from the call center, dialing platform.

To supplement the basic process, the system includes a dialing platform. The AA call list is applied to the dialing platform and then the system initiates outbound calls to the selected TBC parties. The method and the system then accepts responsive in-bound calls to the dialing platform. These responsive inbound calls are responsive to the initiated outbound calls. The method identifies non-productive (NP) calls from the responsive inbound calls. These NP calls include: answer machine responsive calls, disconnect responsive calls, busy responsive calls, special information tone (SIT) responsive calls and no-answer-from-called-party events. Accordingly, NP call data is generated from these identified NP calls. The AA call list is supplemented with NP call data such that respective TBC parties on the AA call list are linked or associated with corresponding NP call data. This is one of the several important features of the present invention because the supplemented AA call list provides a listing of prospective consumers that are not associated with nonproductive calls (the prospective customers are associated with productive calls, not the nonproductive calls). Ultimately, a telecommunications session is initiated between a call center agent and the corresponding TBC party on an in-bound call that is not an NP call.

DETAILED DESCRIPTION OF THE PREFERRED EMBODIMENTS

The present invention relates to a method for managing a dialing list used to initiate outbound calls to a plurality of to-be-called (TBC) parties. Similar numerals designate similar items throughout the drawings. An Abbreviations Table near the end of this patent specification provides some abbreviations used in the drawings and discussed herein.

FIG. 1 diagrammatically illustrates major system elements and the development of an agent approved (AA) call list as well as screen out functions to cull NP calls and improve the AA call list. The system diagrammatically illustrated in FIG. 1 is a distributed calling operation wherein a trusted third-party TTP processor 12 is linked via a telecommunications system (not shown, generally characterized as the Internet), to a call center (CC) server 16. In this distributed computing system, TTP 12 uses database 14 and the TTP server 12 and database 14 are remotely located with respect to call center server 16 and its associated database 18. Sometimes, call center server 16 is operated by a business customer. At other times, call center server 16 is an independent company as compared to the TTP operator. The call center operator has a contract with CC business customers.

The invention operates not only as a distributed computer system but also as a cloud-based system wherein TTP 12 is controlled and operated by a trusted third-party and has substantially exclusive access to a memory system diagrammatically illustrated as database 14 in FIG. 1. The CC server 16 may also be enabled in a cloud-based system wherein server 16 is exclusively operated by the call center system operator. CC database 18 is also exclusively operated by the call center operator in a cloud based system. The method and system described herein can also be completely operated by a single business wherein the operations of TTP server 12 and server 16 are combined. In this singular business system, database 14 and database system 18 are combined. For further explanation of a remote system, a distributed system, a trusted third-party system, a remote call center system, and a singular business system, reference is made to U.S. Pat. No. 9,641,676, for a Call Center Audio Redaction Process and System, issued May 2, 2017, the contents of which is incorporated herein by reference thereto.

In FIG. 1, hub 30 obtains a proposed call list from Internet batch imports, web services, and customer relation management systems (CRMS). The proposed call list may be purchased by the CC business customer or may be compiled from customer lists compiled by the business or its affiliates. In some instances, hub 30 is directly associated with call center server 16 and owned and operated by the CC operator-owner. In any event, the proposed call list is downloaded to TTP database 14. The processor and server at TTP 12 sends the proposed call list to an agent function or module 32. As graphically illustrated in FIG. 1, this proposed call list is shown in a table format which includes fields for a to-be-called (TBC) party, the telephone number of the TBC party, other miscellaneous fields (m1, m2) associated with that TBC party, and a field permitting the agent or operator to select the TBC party or phone number. Functional module block 36 permits the agent or operator select a click-to-call function and select one or more of the proposed TBC parties from the proposed call list initially obtained via hub 30. The agent-operator marks a TBC record or selects blocks of TBC records and the agent-select field is marked yes or no. Therefore the agent-operator develops an agent—approved (AA) call list 40. It is important to match the agent-approved (Y/N) field for each TBC party as part of the call list in the databases 14, 18. In this manner, human interaction is documented in the system. The AA 40 call list is stored in TTP database 14. The AA call list is then sent to dialing platform 20.

The dialing platform initiates outbound calls 42 based upon the AA call list. In response to all these outbound call events, the dialing platform 20 receives responsive call data as "inbound" calls 44. Although reference is made herein to "inbound calls", these telecom event signals refer to the responsive tones and events from the called-party's telephone (the called TBC party) on the AA call list. The term "inbound" refers to the direction of the telecom signal with respect to the dialing platform 20 and not to an independent call into the CC system.

For the inbound responsive telecom session signals, a "screen out" function 46 is operable with the dialing platform and determines whether the responding inbound calls represent a "no answer" responsive event, a "answer machine" (AM) responsive event, a "disconnect" responsive event, a "busy signal" responsive event, a special information tone "SIT" event, and a no-answer-from-party event. When dialing platform 20 detects human voice on the responsive inbound call 44, CC server 16 connects ACC agent with the particular called party. As is known in the call center industry, the agent opens the telecom session with the called-party customer and the agent is presented with the called party record. In FIG. 1, agent 1 is in a telecomm session with called party 1 and agent 2 is in a telecomm session with called party 2.

The output from screen out function 46 is supplied to TTP database 14 and is further supplied to CC server 16 and database 18. A crosscheck module 50 permits the CC server to determine whether the original proposed call list data was accurate and permits the CC server to determine the actual, active line count based upon the response data, the NP data and the live answered call data. Database 18 has a record 52 therein indicating the called party name, phone number, a field for the agent interaction selection (the human "agent selection" field discussed above in connection with the Table 34 in TTP server 12), original source data from the proposed call list, record live call data and real time statistics.

The present inventive method and system addresses several problems in the call center industry. The Telephone Consumer Protection Act ("TCPA") prohibits the use of Automatic Telephone Dialing Systems ("ATDS") to contact consumers on cellular telephones. The implications on the contact center dialing technology industry have been primarily a dramatic reduction in CC agent productivity and an associated increase in labor costs to maintain required consumer contact rates. Dialer vendors have had to add manual steps to the agent experience to achieve TCPA compliance. Many dialers remove the autodialing capabilities and force the agent to manually dial the number making the technology no more effective that having a desktop telephone for each agent. The present invention maintains TCPA compliance while restoring the majority of the productivity lost when the dialing platforms were modified to meet the regulations. An interface with any dialing platform can be provided that can take data via a real time (RT) interface. The inventive system can serve as a hub to take data from many sources (Internet, Batch Imports, Web Services interfaces from other CRMS, etc.) to stage data for a feed into dialing technologies. The inventive system can offer an option to the dialing platform to send the result of the live calls to the TTP database so that the data can be cross referenced against the dialed list to provide real time statistics of list behavior against the original source of the data.

The inventive system adds a manual step in a batch oriented mode that has a single person (or a small set of people) can select TBC records, with a clean and efficient method of manually scanning records and establishing that they have been reviewed for dialing. This manual process, defined as "Clicking", establishes that a TBC record has been scrutinized for dialing and then passed to a dialing technology that eliminates wasted facilities and agent-operator time, energy, and attention. Agents need not key in a 10 digit phone number for each call. The dialing technology explained herein screens out ring-returns for: no answer, answering machines, disconnected numbers and so forth. The dialing technology only sends live calls to the agent, restoring the majority of the productivity to the business.

The TTP Database gets a list of numbers to dial from any number of data sources (the internet, a batch import, etc.). A list of these numbers is presented, with additional data values to establish that the numbers are valid to call, to a person assigned to click on each proposed TBC record that should be sent to the dialing technology. Then, via Dialer APIs, embedded in the TTP infrastructure, the agent-approved AA—TBC call telephone number is pushed into the dialer to be dialed. Once the AA—TBC number is in the dialer, the dialer places the outbound call the dialer listens for busy, AM, SIT tone etc. Live answered calls are only delivered to agents when the dialer has detected that it is connected to a live party on the phone. This system works with any dialing mode on any dialer platform that has an API which will accept a real time feed from an external source.

Figure 2:
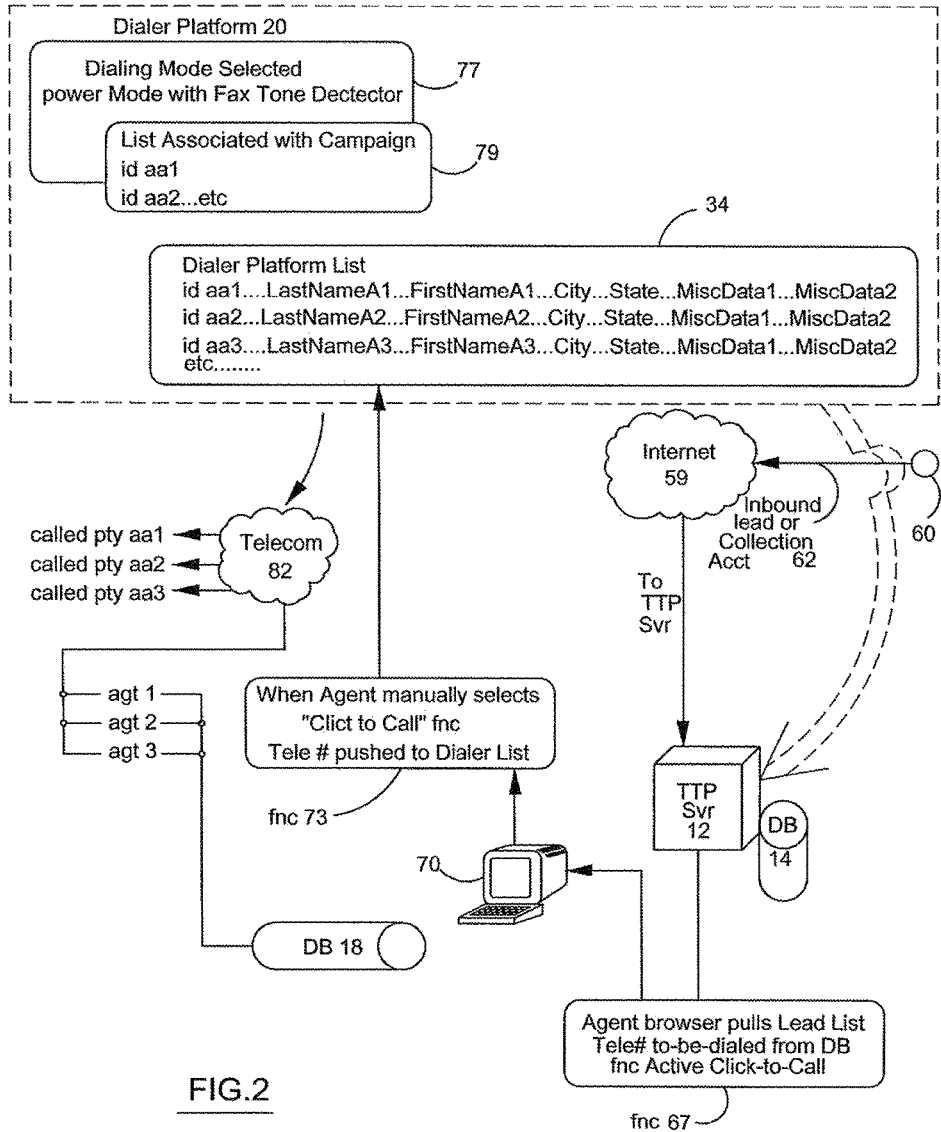
FIG. 2 diagrammatically illustrates a process flow for the management of a dialing list requiring human intervention prior to initiating calls to TBC parties.

FIG. 2 diagrammatically illustrates a flow process in accordance with the principles of the present invention. A source 60 provides inbound leads or collection account data 60 via Internet 59 to TTP server 12. This data is uploaded to TTP server 12 and, more particularly, database 14. In function 67, the call center agent browser (at CC computer 70) pulls up or obtains a proposed call lead list telephone number to be dialed from the database 14. The CC agent-operator has a click-to-call function 36 described in connection with FIG. 1. The CC agent on computer system 70 uses function 73 and manually selects the click-to-call function for some or all of the TBC records in the proposed call list. The resulting agent-approved (AA) selected TBC call record is then pushed to a dialer list 34. Dialer list 34 is graphically shown in dialer platform 20. The call center system operator has earlier selected or will later select a dialing mode function 77 as well as a particular AA call list to be associated with a particular call campaign in function 79.

Dialer platform 20 sends dial out information to telecom network 82 and the called parties are graphically illustrated as aa1, aa2, and aa3 in FIG. 2. If a person answers the call from dialer platform 20, a telecommunications session is opened with the respective agent and corresponding customer, as shown as an initiated telecom session between the called party aa1 and the CC agent Agt 1. The CC agent has access to database 18 which is typically part of the CC server 16. Real time data is compiled and stored for the telecom session.

In the drawings, and sometimes in the specification, reference is made to certain abbreviations. The following Abbreviations Table provides a correspondence between the abbreviations and the item or feature.

Abbreviations Table

| | |
|---|---|
| Admin | Administrator, typically the system operator or administrator |
| agt | agent, as in call center agent or operator |
| API | application program interface |
| ASP | application service provider, typically SAAS or a server on a network providing data input, output and processing services to another |
| cmd | command |
| comm | communications, typically telecommunications, see also session comm |
| comp | computer, includes desk tops, laptops, tablets and smart phones with an internet enabled communications module, any computer-enabled device |
| CPU | central processing unit |
| DB | database |
| disp | display, typically data shown on a monitor or display screen of a computer-enabled device, may be an interactive data input screen displayed to the operator/agent, or may be an output report displayed on the screen, typically display a web page or display of certain information. |
| displ | display, see above |
| e.g. | for example |
| fnc | function, typically a computer function |
| IVR | interactive voice response function |
| mem | memory |
| mod | module, unit or sub-system |
| ntwk | network, namely a telecomm network, typically interne based network. A local area network is also possible. |
| pgm | program |
| ph | phone, namely an interne enabled phone, such as a smart phone |
| ph.no. | phone number |
| proc | processor, typically a microprocessor |
| Pty | party engaged in telecomm or internet enabled communications |
| rcd | database record or record profile |
| re | regarding or relating to |
| RQT | request |
| Rpt | Report |
| rt | real time, may include day and time stamp data |
| sel | select |
| sess | session, as in telecomm session between an agent and a customer |
| Svr | sever, as in web server |
| sys | system |
| Sys Op | System Operator |
| t | time |
| telecom | telecommunications system or network |
| TTP | Trusted Third Party system |
| w/ | with |
| w/in | within |
| w/out | without |
| w/r/t | with respect to |

Description of Typical System Features

The system described above relates to a TTP remote processor or a local TTP processor which (a) displays a call list to an agent or operator; (b) enables the agent to select or deselect one or more to-be-called records representing potential parties to be called; (c) after agent selection, the system delivers the call list to a dialing platform which dials out to the selected-party-to-be-called; (d) the platform then screens inbound calls (eliminating no-answers, etc.) and passes the live calls to an agent to assist or otherwise interact with the called-party. The system and method can be local on the business customer's server or can be a distributed system exchanging information between a remote TTP and the business customer's server and database.

The process and system may be deployed over a wide telecomm connected area, with agents at remote locations (remote compared to the TTP and also remote compared to the business customer server-database). The APP or internet portal permits the person to access the system. If the called-party communicates with the system in a voice mode, the called-party may interact with an interactive voice response system or module, an IVR on the b-customer server.

The present invention processes data via computer systems, over the Internet and/or on a computer network (LAN or WAN), and computer programs, computer modules and information processing systems accomplish these tasks.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Those of skill in the art will appreciate that the various illustrative modules, components, engines and method steps described in connection with the above described figures and embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, components, engines, and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm and the functionality of a component, engine, or module described in connection with the embodiments disclosed herein can be embodied directly in hardware, in software executed by a processor, or in a combination of the two. Software can reside in computer or controller accessible computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A method for managing a dialing list used to initiate outbound calls to a plurality of to-be-called (TBC) parties comprising:

obtaining a proposed call list for said TBC parties;

displaying said proposed call list to an operator;

accepting one or more selection commands associated with one or more of said TBC parties from said operator and generating an agent-approved (AA) call list based upon said one or more selection commands;

initiating outbound calls to said TBC parties using said AA call list wherein TBC parties who are not selected are not on the AA call list and are not subject to said outbound calls;

applying said AA call list to said dialing platform and then initiating said outbound calls to the selected TBC parties;

accepting responsive in-bound calls to said dialing platform, said responsive calls being responsive to the initiated outbound calls;

identifying non-productive (NP) calls from said initiated outbound calls, said NP calls identified from the group of NP calls comprising answer machine (AM) responsive calls, disconnect (DISC) responsive calls, busy responsive (BUSY) calls, special information tone (SIT) responsive calls and no-answer-from-called-party (NACP) events;

generating corresponding NP call data from the identified NP calls including AM data, DISC data, BUSY data, SIT data, and NACP data;

generating a customer relations management (CRM) record for each outbound call associated with said AA call list, said CRM record including for each outbound call: said corresponding NP call data, called party name data, called party phone number data, original source data for each said outbound call; and in the event the outbound call is answered by said called party, supplementing said CRM record with a live answered call (LAC) data; and further supplementing said CRM record with real time live answer call (RTLC) data, said RTLC data recorded in substantially real time live based upon interaction between an agent and said called party.

2. A method for managing a dialing list as claimed in claim 1 wherein, for responsive inbound calls to said dialing platform which are not NP calls, initiating a telecommunications session between a call center agent and the corresponding TBC party on the in-bound call after identifying NP calls; and cross referencing said outbound calls in the CRM record with said NP call data to provide real time list behavior statistics against the original source data.

\* \* \* \* \*